US005169716A

United States Patent [19]

Croft et al.

[11] Patent Number: 5,169,716

[45] Date of Patent: Dec. 8, 1992

[54] ENCAPSULANT COMPOSITIONS FOR USE IN SIGNAL TRANSMISSION DEVICES

[75] Inventors: Thomas S. Croft; Hartwick A. Haugen, both of Austin, Tex.

[73] Assignee: Minnesota Mining and Manufacturing Company, St. Paul, Minn.

[21] Appl. No.: 350,467

[22] Filed: May 11, 1989

Related U.S. Application Data

[62] Division of Ser. No. 19,295, Mar. 9, 1987, Pat. No. 4,857,563.

[51] Int. Cl.$^5$ ........ B32B 15/00; B32B 17/00; G02B 6/04; H02G 15/20

[52] U.S. Cl. ........ 428/379; 428/375; 428/383; 428/392; 174/23 C; 174/107; 174/110.5 R; 174/113 R; 385/100; 385/115; 385/139; 523/173

[58] Field of Search ........ 428/379, 375; 523/173; 524/77, 322; 525/64, 74, 285; 174/107, 23 C; 350/96.24, 96.23

[56] References Cited

U.S. PATENT DOCUMENTS

| | | | |
|---|---|---|---|
| 3,836,695 | 9/1974 | Strecker et al. | 174/23 C |
| 4,102,716 | 7/1978 | Groves et al. | 156/48 |
| 4,168,258 | 9/1979 | Brauer et al. | 260/36.6 |
| 4,171,998 | 10/1979 | Brauer et al. | 156/48 |
| 4,191,799 | 3/1980 | Gruber | 428/96 |
| 4,231,986 | 11/1980 | Brauer et al. | 264/272 |
| 4,259,540 | 3/1981 | Sabia | 174/23 C |
| 4,281,210 | 7/1981 | Brauer et al. | 174/23 C |
| 4,324,453 | 4/1982 | Patel | 174/23 C |
| 4,329,442 | 5/1982 | Pokorny | 528/49 |
| 4,355,130 | 10/1982 | Heinze | 524/491 |
| 4,375,521 | 3/1983 | Arnold | 523/173 |
| 4,497,663 | 2/1985 | Fisher et al. | 134/4 |
| 4,533,598 | 8/1985 | Downey et al. | 428/380 |
| 4,596,743 | 6/1986 | Brauer et al. | 428/380 |
| 4,619,951 | 10/1986 | Gorke et al. | 523/173 |
| 4,756,851 | 7/1988 | Billigmeier et al. | 174/23 C |
| 4,787,703 | 11/1988 | Tomko et al. | 174/23 C |
| 4,849,579 | 7/1989 | Chapin et al. | 174/23 C |
| 4,857,563 | 8/1989 | Croft et al. | 524/77 |
| 4,927,801 | 5/1990 | Mahmud | 503/200 |
| 4,985,475 | 1/1991 | Croft et al. | 523/173 |

FOREIGN PATENT DOCUMENTS

| | | | |
|---|---|---|---|
| 1219951 | 1/1971 | United Kingdom | 585/64 |

OTHER PUBLICATIONS

I. G. Meldrum, R. G. Fisher and A. J. Plomer, "Oil Solidifying Additives for Oil Spills", Proceeding of the Fourth Arctic Marine Oil Spill Program Technical Seminar, pp. 325-352 (1981).

G. McGibbon, R. G. Fisher, I. G. Meldrum and A. J. Plomer, "Further Development in Oil Spill Solidification", Proceedings of the Fifth Arctic Marine Oil Spill Program Technical Seminar, pp. 199-210 (1982).

*Primary Examiner*—Patrick J. Ryan
*Assistant Examiner*—J. M. Gray
*Attorney, Agent, or Firm*—Gary L. Griswold; Walter N. Kirn; Steven E. Skolnick

[57] ABSTRACT

The invention provides an encapsulant composition capable of use with signal transmission devices, such as electrical or optical cable. The composition is the extended reaction product of an admixture of an anhydride functionalized composition and a crosslinking agent.

34 Claims, No Drawings

ENCAPSULANT COMPOSITIONS FOR USE IN SIGNAL TRANSMISSION DEVICES

This is a division of application Ser. No. 07/019,295 filed Mar. 9, 1987 and now U.S. Pat. No. 4,857,563.

TECHNICAL FIELD

This invention relates to encapsulating compositions, useful in encapsulating signal transmission devices.

BACKGROUND OF THE INVENTION

Encapsulating compositions are often used to provide a barrier to contaminants. Encapsulants are typically used to encapsulate a device, such as a splice between one or more conductors, through which a signal, such as an electrical or optical signal, is transmitted. The encapsulant serves as a barrier to fluid and non-fluid contamination. It is often necessary that these devices, particularly splices, be re-entered for repairs, inspection or the like. In this use and others, it is desirable that the encapsulant be non-toxic, odorless, easy to use, transparent, resistant to fungi, and inexpensive.

Signal transmission devices, such as electrical and optical cables, typically contain a plurality of individual conductors, each of which conduct an electrical or optical signal. A grease-like composition, such as FLEXGEL, (commercially available from AT&T) is typically used around the individual conductors. Other filling compositions include petroleum jelly (PJ) and polyethylene modified petroleum jelly (PEPJ). For a general discussion of cable filling compositions, and particularly FLEXGEL type compositions, see U.S. Pat. No. 4,259,540.

When cable is spliced it is often the practice to clean the grease-like composition from the individual conductors so that the encapsulant will adhere to the conductor upon curing, preventing water or other contaminants from seeping between the conductor and the encapsulant. Therefore, an encapsulant which will adhere directly to a conductor coated with a grease-like composition is highly desirable.

Many of the connecting devices (hereinafter connectors) used to splice individual conductors of a cable are made from polycarbonate. A significant portion of prior art encapsulants are not compatible with polycarbonate, and thus, stress or crack connectors made from this material over time. Therefore, it is desirable to provide an encapsulant which is compatible with a polycarbonate connector.

Many of the prior art encapsulants, which have addressed the above problems with varying degrees of success, are based on polyurethane gels. Various polyurethane based gels are disclosed in U.S. Pat. Nos. 4,102,716; 4,533,598; 4,375,521; 4,355,130; 4,281,210; 4,596,743; 4,168,258; 4,329,442; 4,231,986; 4,171,998; Re 30,321; 4,029,626 and 4,008,197. However, all of the polyurethane gels share at least two common problems. It is well known in the art that isocyanates are extremely reactive with water. The above polyurethane systems utilize two part systems which include an isocyanate portion and a crosslinking portion designed to be added to the isocyanate when it is desired that the gel be cured. Because of the water reactivity of isocyanates, it has been necessary to provide involved and expensive packaging systems to keep the isocyanate from reacting with water until such time as the isocyanate can be cured with the crosslinking agent.

Further, it is well known in the art that isocyanate compounds are hypo-allergenic, and thus, can induce allergic reactions in certain persons. This is of particular concern when a two part system is used which requires a worker to mix the components on site.

Therefore, it is highly desirable to provide an encapsulant which may be used in conjunction with a signal transmission device as a water-impervious barrier, which has good adhesion to grease-coated conductors, which is compatible with polycarbonate splice connectors, and which does not require the use of an isocyanate compound.

SUMMARY OF THE INVENTION

The present invention provides an encapsulant composition capable of use as an encapsulant for signal transmission devices, such as electrical or optical cables. It is to be understood that the invention has utility as an encapsulant for signal transmission devices which are not cables, for example, electrical or electronic components and devices, such as sprinkler systems, junction box fillings, to name a few. It is further contemplated that the encapsulant may have utility as an encapsulant or sealant for non-signal transmitting devices.

The encapsulant comprises an extended reaction product of an admixture of: 1) an anhydride functionalized compound having reactive anhydride sites; and 2) a crosslinking agent which reacts with the anhydride site of the anhydride functionalized compound. The reaction product is extended with at least one organic plasticizer, preferably essentially inert to the reaction product and substantially non-exuding.

The encapsulant may be used in a signal transmission component, for example, in a cable splice which comprises; 1) an enclosure member; 2) a signal transmission device, which includes at least one signal conductor; and 3) at least one connecting device joining the at least one conductor to at least one other conductor in the enclosure member. The signal conductor is capable of transmitting a signal, for example, an electrical or optical signal.

The invention also contemplates a method for filling an enclosure containing a signal transmission device comprising mixing an anhydride portion and a crosslinking portion together to form a liquid encapsulant, pouring the liquid encapsulant composition into an enclosure at ambient temperature, the liquid encapsulant curing to form a cross-linked encapsulant which fills the enclosure including voids between the individual conductors of the transmission device. The liquid encapsulant composition of the invention may also be forced into a contaminated component under pressure to force the contaminant from the component, the encapsulant subsequently curing to protect the component from recontamination. The liquid encapsulant composition may also be poured into a component so that upon curing the encapsulant forms a plug or dam in a cable or the like.

DETAILED DESCRIPTION

The encapsulant of the invention is suited for use as an encapsulant for signal transmission devices and other uses in which a water-impervious, preferably reenterable, barrier is desired. The encapsulant is formed by cross-linking an anhydride functionalized compound with a suitable cross-linking agent in the presence of an organic plasticizer which extends the reaction product. The plasticizer is preferably essentially inert to the reaction product and substantially non-exuding. The plasticizer system chosen contributes to the desired properties of the encapsulant, such as, the degree of adhesion to grease-coated conductors, the degree of compatibility with polycarbonate connectors, and the softness or hardness of the encapsulant.

"Essentially inert" as used herein means that the plasticizer does not become cross-linked into the reaction between the anhydride functionalized compound and the cross-linking agent.

"Non-exuding" as used herein means that the plasticizer has the ability to become and remain blended with the reaction product of the anhydride functionalized compound and the cross-linking agent. Many excellent plasticizers experience some blooming, or a slight separation from the solid, especially at higher temperatures, and over lengthy storage times. These plasticizers are still considered to be "substantially non-exuding".

"Anhydride functionalized compound" as used herein is defined as a polymer, oligomer, or monomer, which has been reacted to form a compound which has anhydride reactive sites thereon.

Examples of anhydride functionalized compound which are suitable for use in the encapsulant of the invention include maleinized polybutadiene-styrene polymers (such as Ricon 184/MA), maleinized polybutadiene (such as Ricon 131/MA or Lithene LX 16-10MA), maleic anhydride modified vegetable oils (such as maleinized linseed oil, dehydrated castor oil, soybean oil or tung oil, and the like), maleinized hydrogenated polybutadiene, maleinized polyisoprene, maleinized ethylene/propylene/ 1,4-hexadiene terpolymers, maleinized polypropylene, maleinized piperylene/2-methyl-1-butene copolymers, maleinized polyterpene resins, maleinized cyclopentadiene, maleinized gum or tall oil resins, maleinized petroleum resins, copolymers of dienes and maleic anhydride or mixtures thereof. Maleinized polybutadiene is preferred.

Suitable cross-linking agents of the invention are compounds which will react with the anhydride sites of the anhydride functionalized compound to form a cross-linked polymer structure. Cross-linking agents suitable for the present invention include polythiols, polyamines and polyols, with polyols preferred.

Suitable polyol cross-linking agents include, for example, polyalkadiene polyols (such as Poly bd R-45HT), polyether polyols based on ethylene oxide and/or propylene oxide and/or butylene oxide, ricinoleic acid derivatives (such as castor oil),polyester polyols, fatty polyols, ethoxylated fatty amides or amines or ethoxylated amines, hydroxyl bearing copolymers of dienes or mixtures thereof. Hydroxyl terminated polybutadiene such as Poly bd R-45HT is presently preferred.

The castor oil which may be used is primarily comprised of a mixture of about 70% glyceryl triricinoleate and about 30% glyceryl diricinoleate-monooleate or monolinoleate and is available from the York Castor Oil Company as York USP Castor Oil. Ricinoleate based polyols are also available from Caschem and Spencer-Kellogg. Suitable interesterification products may also be prepared from castor oil and substantially non-hydroxyl-containing naturally occurring triglyceride oils as disclosed in U.S. Pat. No. 4,603,188.

Suitable polyether polyol cross-linking agents include, for example, aliphatic alkylene glycol polymers having an alkylene unit composed of at least two carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed. A typical polyether polyol is available from Union Carbide under the designation Niax PPG-425. Specifically, Niax PPG-425, a copolymer of a conventional polyol and a vinyl monomer, represented to have an average hydroxyl number of 263, an acid number of 0.5, and a viscosity of 80 centistokes at 25° C.

The general term polyether polyols also includes polymers which are often referred to as amine based polyols or polymeric polyols. Typical amine based polyols include sucrose-amine polyol such as Niax BDE-400 or FAF-529 or amine polyols such as Niax LA-475 or LA-700, all of which are available from Union Carbide.

Suitable polyalkadiene polyol cross-linking agents can be prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl groups having about 1 to about 4 carbon atoms, substituted aryl, unsubstituted ary, halogen and the like. Typical of such dienes are 1,3-butadiene, isoprene, chloroprene, 2-cyano-1,3-butadiene, 2,3-dimethyl-1,2- butadiene, and the like. A hydroxyl terminated polybutadiene is available from ARCO Chemicals under the designation Poly-bd R-45HT. Poly-bd R-45HT is represented to have a molecular weight of about 2800, a degree of polymerization of about 50, a hydroxyl functionality of about 2.4 to 2.6 and a hydroxyl number of 46.6. Further, hydrogenated derivatives of the polyalkadiene polymers may also be useful.

Besides the above polyols, there can also be employed lower molecular weight, reactive, chain-extending or crosslinking compounds having molecular weights typically of about 300 or less, and containing therein about 2 to about 4 hydroxyl groups. Materials containing aromatic groups therein, such as N, N-bis (2-hydroxypropyl) aniline may be used to thereby produce useful gels.

To insure sufficient crosslinking of the cured gels the polyol based component preferably contain polyols having hydroxyl functionality of greater than 2. Examples of such polyols include polyoxypropylene glycol, polyoxyethylene glycol, polyoxytetramethylene glycol, and small amounts of polycaprolactone glycol. An example of a suitable polyol is Quadrol, N,N,N',N'-tetrakis-(2-hydroxypropyl)-ethylene diamine, available from BASF Wyandotte Corp.

Suitable polythiol and polyamine cross-linking agents may vary widely within the scope of the invention and include (1) mercaptans and (2) amines which are polyfunctional. These compounds are often hydrocarbyl substituted but may contain other substituents either as pendant or catenary (in the backbone) units such as cyano, halo, ester, ether, keto, nitro, sulfide or silyl groups. Examples of compounds useful in the present invention included the polymercapto-functional compounds such as 1,4-butanedithiol, 1,3,5-pentanetrithiol, 1,12-dodecanedithiol; polythio derivatives of polybutadienes and the mercapto-functional compounds such as the di- and tri-mercaptopropionate esters of the poly(oxypropylene) diols and triols. Suitable organic diamines include the aromatic, aliphatic and cycloaliphatic diamines. Illustrative examples include: amine terminated polybutadiene, the polyoxyalkylene polyamines, such as those available for Texaco Chemical Co., Inc., under the tradename Jeffamine, the D, ED, DU, BuD and T series.]

The reaction product of an anhydride functionalized compound and a suitable cross-linking agent is typically in the range of between about 5 and 95 percent and preferably between about 20 and 70 percent.

The plasticizing system, which extends the reaction product of the anhydride functionalized compound and the cross-linking agent contributes to many of the functional characteristics of the encapsulant of the present invention. Plasticizing system refers to the one or more plasticizer compounds which may be used together to achieve the desired properties for the encapsulant. The plasticizing system is preferably selected so as to be essentially inert with the reaction product of the anhydride functionalized compound and the cross-linking agent and substantially non-exuding. The plasticizing system selected also preferably provides an encapsulant which has excellent adhesion to grease-coated conductors and which is compatible with polycarbonate connectors.

Plasticizer compounds which may be used to achieve a suitable plasticizing system include aliphatic, naphthenic, and aromatic petroleum based hydrocarbon oils; cyclic olefins (such as polycyclopentadiene,) vegetable oils (such as linseed oil, soybean oil, sunflower oil, and the like); saturated or unsaturated synthetic oils; polyalphaolefins (such as hydrogenated polymerized decene-1), hydrogenated terphenyls, propoxylated fatty alcohols (such as PPG-11 stearyl alcohol); polypropylene oxide mono- and di- esters, pine oil-derivatives (such as alpha-terpineol), polyterpenes, cyclopentadiene copolymers with fatty acid esters, phosphate esters and mono-, di-, and poly-esters, (such as trimellitates, phthalates, benzoates, fatty acid ester derivatives, castor oil derivatives, fatty acid ester alcohols, dimer acid esters, glutarates, adipates, sebacates and the like) and mixtures thereof. Particularly preferred are a mixture of hydrocarbon oils with esters.

Examples of polyalphaolefins which may be used as plasticizers in the present invention are disclosed in U.S. Pat. No. 4,355,130.

Examples of vegetable oils useful as plasticizers in the present invention are disclosed in U.S. Pat. No. 4,375,521.

The plasticizer compounds used to extend the reaction product of the anhydride functionalized compound and the cross-linking agent are typically present in the range of between about 35 and 85 percent by weight of the encapsulant, and preferably between about 50 and 70 percent.

Previously it has been difficult to provide an encapsulant which has excellent adhesion to grease-coated wires and which also does not stress or crack a polycarbonate splice module. It has been discovered that by using a plasticizing system, in conjunction with a cross-linked anhydride functionalized compound, to provide an encapsulant having a particular total solubility parameter, both of these objectives can be achieved.

It has been discovered that the total solubility parameter of an encapsulant of the present invention can be an indication of an encapsulant's ability to adhere to grease-coated conductors and of its compatibility with polycarbonate connectors. The solubility parameter value (represented by $\delta$) is a measure of the total forces holding the molecules of a solid or liquid together and is normally given without units [actual units--(Cal/per cc)$^{\frac{1}{2}}$]. Every compound or system is characterized by a specific value of solubility parameters and materials having similar solubility parameters tend to be miscible. See, for example, A. F. M. Barton "CRC Handbook of Solubility Parameters and Other Cohesion Parameters", 1983, CRC Press, Inc.

Solubility parameters may be obtained from literature values or may be estimated by summation of the effects contributed by all the groups in a molecular structure using available group molar attraction constants developed by Hoy, utilizing the following equation:

$$\delta = \frac{\Sigma F_T + 135.1}{V_M}$$

and using the group molar attraction constants in K. L. Hoy, "Tables of Solubility Parameters", Union Carbide Corp. 1975; J. Paint Technol 42, 76 (1970), where $\Sigma F_T$ is the sum of all the group molar attraction constants ($F_T$), $V_M$ is the molar volume (MW/d), MW is the molecular weight and d is the density of the material or system in question.

This method can be used to determine the solubility parameters of the cross-linked polymer and the individual value of each component if the chemical structure is known.

To determine the solubility parameter for hydrocarbon solvents, the following equation was utilized:

$$\delta = 6.9 + 0.02 \text{ Kauri-butanol value}$$

The Kauri-butanol value was calculated using the following equation:

$$KB = 21.5 + 0.206 \text{ (\% wt. naphthenes)} + 0.723 \text{ (\% wt. aromatics)}$$

See, W. W Reynolds and E. C. Larson, Off., Dig., Fed. Soc. Paint Technol. 34, 311 (1962); and Shell Chemicals, "Solvent Power", Tech. Bull ICS (x)/79/2,1979.

The approximate compositions for the hydrocarbon oil can be obtained from the product brochures under the carbon type analysis for naphthenic and aromatic carbon atoms.

Cross-linked polymers may swell by absorbing solvent but do not dissolve completely. The swollen macromolecules are called gels.

For a plasticized crosslinked polymer system, the total solubility parameter would be the weighted arithmetic mean of the value of each component.

$$\delta_T = \delta_a\phi_a + \delta_b\phi_b + \delta_c\phi_c \ldots$$

Where $\phi_a$, $\phi_b$, and $\phi_c$ are the fractions of A,B,and C in the system and $\delta_a$, $\delta_b$, and $\delta_c$ are the solubility parameter of the individual components.

A plasticized crosslinked polymer system with a total solubility parameter of between about 7.9 and about 9.5 would be substantially compatible with the major constituents in the PJ, PEPJ, or FLEXGEL compositions. In order to achieve maximum compatibility with the grease compositions and also be compatible with polycarbonate, the total solubility of the encapsulant is preferably between about 7.9 and about 8.6, and more preferably, between about 8.0 and about 8.3.

The reaction between the anhydride functionalized compound and the cross-linking agent may be catalyzed to achieve an increased curing rate. The type of catalyst useful for this reaction will depend upon the nature of the anhydride functionalized compound and the cross-linking agent. Many tertiary amine catalysts have been found to be particularly useful ("tertiary amine", as used herein, is meant to include amidines and quanidines as well as simple tri-substituted amines). These tertiary amine catalysts include 1,8-diazabicyclo[5.4.0]undec-7-ene (DBU), 1,5-diazabicyclo[4.3.0]non-5-ene (DBN), and salts thereof, tetradecyldimethylamine, octyldimethylamine, octadecyldimethylamine, 1,4-diazabicyclo[2.2.2]octane, tetramethylguanidine, 4-dimethylaminopyridine, and 1,8-bis(dimetyhlamino)-naphthalene, with DBU and DBN being especially preferred on the basis of the more rapid reaction rates provided.

Although the use of a catalyst is generally not necessary when the crosslinking agent is amine functional, addition of catalysts such as DBU and DBN may have an accelerating effect upon the reaction rate.

Although the crosslinking reactions to prepare the encapsulant compositions of the present invention are preferably conducted at or near ambient temperature, it should be obvious to one skilled in the art that the reaction rate may be accelerated, if desired, by the application of elevated temperatures.

It is also possible to add other additives, such as fillers, fungicides, oxidation preventatives or any other additive as necessary. As oxidation preventatives, there can be used hindered phenols, for example, Irganox 1010, Tetrakis methylene (3,5-di-tert-butyl-4-hydroxyhydrocinnamate)methane, and Irganox 1076, Octadecyl B(3,5-tert-butyl-4-hydroxyphenol) propionate, (made by the Ciba-Geigy Company).

As stated above, the most common grease-like substance which is used to fill cables is FLEXGEL, an oil extended thermoplastic rubber, commercially available from AT & T. Other filling compositions include petroleum jelly (PJ) and polyethylene modified petroleum jelly (PEPJ). All such cable filling compositions are herein collectively referred to as grease.

To quantify the adhesion of an encapsulant to grease-coated conductors a test to determine an encapsulant's C-H Adhesion Value will be used. In general, this test measures the amount of force it takes to pull a grease-coated conductor from a vessel containing a cured encapsulant. The greater the force which is required, the greater the adhesion.

To determine the C-H Adhesion Value of an encapsulant the following test was conducted. Six, 0.046 cm (22 gauge) polyethylene insulated conductors (PIC), taken from a length of FLEXGEL filled telephone cable purchased from General Cable Co. were cut into 15 cm lengths. The test vessels were filled almost flush with the top edge with the test encapsulant. A lid was placed thereon and a coated conductor was inserted into each hole such that 4 cm of the conductor protrude above the lid. A tape flag was placed at the 4 cm mark to support the conductors while the encapsulant cured. After four days at room temperature the lid was removed and the vessel mounted in a Instron tensile testing machine. Each conductor was pulled out of the encapsulant at a crosshead speed of about 0.8 mm/sec. The maximum pull-out force was measured in Newtons/conductor for each of the conductors. The average of the six values in Newtons/conductor was assigned as the C-H Adhesion Value. Similar tests were also run to determine the C-H Adhesion Value for conductors coated with a PEPJ grease and are included in the examples below. A C-H Adhesion Value of at least 4 is an acceptable value (4 Newtons/conductor maximum pull-out force), with a C-H Adhesion Value of at least 13 preferred.

As noted, a further concern in formulating an encapsulant for use in splice enclosures is the compatibility of the encapsulant with polycarbonate connectors. Compatibility is evidenced by a lack of stressing or cracking of a polycarbonate connector over time. An encapsulant's compatibility with polycarbonate will be quantified by assigning a Polycarbonate Compatibility Value (PCV). This will be measured by means of a stress test conducted on polycarbonate modules which have been encapsulated in a particular encapsulant at an elevated temperature for an extended period of time. The percentage of the original flexure test control value after nine weeks at 50° C. will be designated as the Polycarbonate Compatibility Value. The original flexure test control value is the breaking force in Newtons of three polycarbonate modules following flexure test ASTM D790 using an Instron tensile machine at a crosshead speed of about 0.2 mm/sec. An acceptable Polycarbonate Compatibility Value is 80 (80% of the average of the three control modules), with a value of 90 being preferred.

Polycarbonate Compatibility Values were determined as follows: Three control modules were crimped with the recommended maximum wire gauge, the wires had solid polyethylene insulation. This produced maximum stress on each module. The breaking force of the three modules was measured in Newtons, using the flexure test outlined in ASTM D790 on an Instron tensile machine, at a cross head speed of about 0.2 mm/sec. The average of these three values was used as the control value. Three crimped modules were placed in a tray and submerged in encapsulant. The tray was placed in an air pressure pot under 1.41 $Kg/cm^2$ pressure for 24 hours, while the encapsulant gelled and cured. After 24 hours, the tray with the encapsulated modules was placed in an air circulating oven at 50° C. for 9 weeks.

After 9 weeks, the samples were removed and allowed to cool to room temperature. The encapsulant was peeled from the modules. The breaking force of the three modules was measured following the ASTM D790 flexure test. The average of these three values, divided by that of the control, multiplied by 100, is assigned as the Polycarbonate Compatibility Value.

The following lists of commercially available components were used in the examples which follow. Preparations A through E were prepared as described. The function of each component is also listed. Function is indicated as follows: Anhydride Functionalized Compound —"AFC"; Cross-linking Agent—"CA"; plasticizer compound—"P"; and catalyst—"C".

The invention is further described in the following non-limiting inventions wherein all parts are by weight. Where a particular test was not run in a particular example it is indicated by "—".

PREPARATION A

MALENIZED LINSEED OIL

Linseed Oil (Spencer Kellogg "Superior", 800 grams) and maleic anhydride (MCB, 153.6 grams) were added to a one liter resin flask equipped with a mechanical stirrer, gas inlet tube, reflux condensor connected to a gas trap and a thermowell. The vessel headspace was purged with nitrogen flowing at 2 liters per minute for 30 minutes while the mixture was stirred slowly. The mixture was heated using three 250 watt infrared lamps, two of which were controlled by a Therm-O-Watch connected to a sensing head on a thermometer contained in the thermowell. The temperature rose from room temperature to 200° C. within 30 minutes and was held at 200° C. for three hours. After cooling, the amount of unreacted anhydride was estimated by dissolving a weighed sample of the product in toluene, extracting the toluene with water and titrating an aliquot of the water extract with standard alkali. The results showed less than 0.03% unreacted anhydride remained in the product.

PREPARATION B

MALENIZED POLYISOPRENE

Polybutadiene (Hardman Isolene 40, 661.5 grams), maleic anhydride (Fisher Scientific, 33.1 grams) and 2,6-di-t-butyl-4-methyl phenol (Aldrich 3.31 grams) were added to the apparatus described above. After purging the headspace with nitrogen, a small quantity of xylenes (Baker, bp 137–140, 33 grams) was added through the reflux condensor. The mixture was heated with stirring to 180° C. over 45 minutes and held at the temperature for 3.5 hours. The gas inlet was replaced with a stopper, the condensor replaced with a vacuum distillation head and the reaction mixture held at 150° C. under pump vacuum until no vapor bubbles appeared in the liquid phase. After cooling the product was tested for loss on drying at 105° for 24 hours in a forced air oven and found to lose 1.2% of its original weight.

PREPARATION C

AMINE COMPOUND A

The following amine compound was prepared by charging to a reaction vessel 33.92 gram of 1,6-hexanediamine, 0.58 equivalents, and 66.08 gram n-butyl acrylate (0.58 equivalents). The vessel was mixed and heated slightly for 3 days to produce the Michael adduct. Spectral analysis confirmed that the addition had taken place.

PREPARATION D

AMINE COMPOUND B

By a procedure similar to that described for Amine Compound A, Amine Compound B was formed by the Michael addition of Jeffamine T-403 (polyether triamine from Texaco Chemicals, Inc., amine equivalent weight 146) to n-butyl acrylate. Spectral analysis confirmed the addition.

PREPARATION E

AMINE COMPOUND C

Amine Compound C was prepared by a similar procedure as Amine Compound B substituting isooctyl acrylate for n-butyl acrylate. Spectral analysis confirmed the addition.

COMPONENT TABLE

| MATERIALS | DESCRIPTION | SOURCE | FUNCTION |
|---|---|---|---|
| Ricon 131/MA | Polybutadiene (80 ± 5% Trans and Cis 1,4 vinyl, 20 ± 5% 1,2 vinyl) - Maleic anhydride adduct with average molecular weight of about 6000 and equivalent weight of about 1745 | Colorado Chemical Specialities, Inc. | AFC |
| Lithene LX16-10MA | Polybutadiene (50–60% 1,4-Trans, 25–35%, 1,4 Cis, 10–15% 1,2 vinyl) - Maleic anhydride adduct with average molecular weight of about 8800 and equivalent weight of about 1100 | Revertex Ltd. | AFC |
| Lithene PM 25 MA | Polybutadiene (30–40% 1,4-Trans, 15–25% 1,4 Cis, 40–50% 1,2 vinyl) - Maleic anhydride adduct with average molecular weight of about 1750 and equivalent weight of about 381 | Revertex Ltd. | AFC |
| Lithene PM 12 MA | Polybutadiene - Maleic anhydride adduct with average molecular weight of about 1457 and equivalent weight of about 911 | Revertex Ltd. | AFC |
| Lithene PM 6 MA | Polybutadiene - Maleic anhydride adduct with average molecular weight of about 1378 and equivalent weight of about 1723 | Revertex Ltd. | AFC |
| Nisso BN 1015 | Polybutadiene (>85% 1,2 vinyl) - maleic anhydride adduct with average molecular weight of about 1207 and equivalent weight of about 750 | Nippon Soda Co., Ltd. | AFC |
| Ricon 184/MA | Butadiene-styrene random copolymer - maleic anhydride adduct with average molecular weight of about 10,000 and equivalent weight of about 1730 | Colorado Chemicals Specialities, Inc. | AFC |
| Maleinized Polyisoprene | Cis 1,4 polyisoprene (Hardman Isolene 40) - maleic anhydride adduct (10 parts MA to 100 parts Isolene 40) with acid number of about 32 | Prepared | AFC |
| Maleinized Linseed Oil | Linseed Oil (Spencer Kellog Superior Linseed Oil) - maleic anhydride adduct (19.2 parts MA to 100 parts Linseed Oil) | Prepared | AFC |
| PA-18 | Copolymer of octadecene-1 and maleic anhydride with average molecular weight of about 50,000 | Gulf Oil | AFC |
| Poly bd R-45 HT | Hydroxyl terminated polybutadiene (about 60% Trans-1,4, 20% Cis, 1,4 and 20% 1,2 vinyl) with average molecular weight of about 3000 and hydroxyl functionality of about 2.5 | Arco Chemical Co. | CA |
| Nisso G-1000 | Hydroxyl terminated polybutadiene (>90% 1,2 vinyl) with average molecular weight of about 2000 and hydroxyl functionality of >1.6 | Nippon Soda Co., Ltd. | CA |
| Nisso G-2000 | Hydroxyl terminated polybutadiene (>90% 1,2 vinyl) with average molecular weight of about 1350 and hydroxyl functionality of >1.6 | Nippon Soda CO., Ltd. | CA |
| Nisso G-3000 | Hydroxyl terminated polybutadiene (>90% 1,2 vinyl) with average molecular weight of about 3000 and hydroxyl functionality of >1.6 | Nippon Soda Co., Ltd. | CA |
| Nisso GI-1000 | Hydrogenated Hydroxyl terminated polybutadiene (>90% 1,2 vinyl) with average molecular weight of about 1400 and hydroxyl functionality of >1.6 | Nippon Soda Co., Ltd. | CA |
| Nisson GI-3000 | Hydrogenated Hydroxyl terminated polybutadiene (>90% 1,2 vinyl) with average molecular weight of about 3100 and hydroxyl functionality of >1.6 | Nippon Soda Co., Ltd. | CA |

-continued

COMPONENT TABLE

| MATERIALS | DESCRIPTION | SOURCE | FUNCTION |
|---|---|---|---|
| York USP Caster Oil | Vegetable oil of about 70% glyceryl triricinolein and about 30% glyceryl diricinolein mono-oleate or monolinoleate and hydroxyl functionality about 2.7 | York Caster Oil Co. | CA |
| Flexricin 17 | Pantaerythritol mono-ricinoleate (three primary hydroxyls and 1 secondary hydroxyl) | CasChem, Inc. | CA |
| Pluronic L121 | Poly (oxypropylene) - poly (oxethylene) block copolymer with hydroxyl functionality of 2 and average molecular weight of about 4400 | BASF Wyandotte Corp. | CA |
| Pluronic L101 | Poly (oxypropylene) - poly (oxethylene) block copolymer with average molecular weight of about 3800 and hydroxyl functionality of 2 | BASF Wyandotte Corp. | CA |
| Pluracol TPE 4542 | Polyether polyol with average molecular weight of about 4550 and hydroxyl functionality of 3 | BASF Corp. | CA |
| Pluracol 355 | Polyether-polyol with average molecular weight of about 500 and hydroxyl functionality of 4 | BASF Corp. | CA.C |
| Sovermol VP95 | Fatty ether triol with average molecular weight of about 456 with two primary hydroxyl and one secondary hydroxyl | Henkel Corp. | CA |
| Quadrol | Tetrakis (2-hydroxyl propyl) ethylenediamine with average molecular weight or 292 and four secondary hydroxyls | BASF Wyandotte Corp. | CA.C |
| Ethoduomeen T/13 | Ethoxylated fatty diamines with average molecular weight of about 470 and three primary hydroxyls | Armak | CA.C |
| Polycat DBU | 1,8 diaza-bicyclo (5,4,0) undecene-7 | Air Products | C |
| Polycat SA-1 | Phenolic salt of DBU | Air Products | C |
| Polycat SA-102 | 2-ethyl hexanoate salt of DBU | Air Products | C |
| Flexon 766 | Naphthenic Oil, Aniline pt 224 | Exxon Co. | P |
| Tufflo 500 | Naphthenic Oil, Aniline pt 192 | Arco | P |
| Flexon 650 | Naphthenic Oil, Aniline pt 190 | Exxon Co. | P |
| Tufflo 300 | Naphthenic Oil, Aniline pt 188 | Arco | P |
| Sunthane 4130 | Naphthenic Oil, Aniline pt 181 | Sun Oil Co. | P |
| Sunthane 480 | Naphthenic Oil, Aniline pt 178 | Sun Oil Co. | P |
| Calumet 450 | Naphthenic Oil, Aniline pt 196 | Calumet Refining Co. | P |
| Dabco 33-LV | Triethylene diamine | Air Products | C |
| T-8 | Dibutyltin laurate | M&T Chem., Inc. | C |
| ADMA 4 | Tetradecyldimethylamine | Ethyl Chemicals | C |
| N,N,N',N'-tetramethyl-1,4-butadiamine | | Aldrich Chem. Co. | C |
| Flexon 391 | Aromatic Oil, Aniline pt 129 | Exxon Co. | P |
| Sundex 750T | Aromatic Oil, Aniline pt 121 | Sun Oil Co. | P |
| Telura 171 | Aromatic Oil, Aniline pt 117 | Exxon Co. | P |
| Paol 40 | Polyalphaolefin | Burmah-Castrol Inc. | P |
| Plasthall 100 | Isooctyl Tallate | C.P. Hall Co. | P |
| Plasthall DTDA | Ditridecyl Adipate | C.P. Hall Co. | P |
| Plasthall R-9 | Octyl Tallate | C.P. Hall Co. | P |
| Schercemol PGDP | Propylene glycol dipelargonate | Scher Chemical | P |
| Soybean Oil | Supreme Soybean Oil | Spencer Kellogg | P |
| Alpha-Terpincol | — | Hercules Inc. | P |
| Tarpine 66 | — | Richhold | P |
| Tricresyl Phosphate | — | FMC Inc. | P |
| Wickenol 171 | 2-ethylhexyl Oxystearate | Wickenol Products Inc. | P |
| Witconol APS | PPG-11 Stearyl Ether | Witco Chemical | P |
| Yarmor 302 | Pine Oil | Hercules Inc. | P |
| Acintene DP738 | Dipentene | Arizona Chemical Co. | P |
| Cykellin | Dicyclopentadiene copolymer of linseed oil | Spencer Kellogg | P |
| Diundecyl Phthalate | — | Monsanto | P |
| Emory 2900 | Dioctyl dimerate | Emery | P |
| Escopol R-020 | Polycyclopentadiene | Exxon Chemical | P |
| Falkowood 51 | Maleinized Oil | Cargill | P |
| Finsolv TN | C12-15 Alcohols Benzoate | Finetex, Inc. | P |
| Flexricin P-8 | Glyceryl tri (acetyl ricinoleate) | CasChem, Inc. | P |
| Indopol H-100 | Polybutene | Amoco Chemical Corp. | P |
| Isocetyl Stearate | — | Stepan Co. | P |
| Kemester 3681 | Di-octyl Dimerate | Humko Chemical Co. | P |
| Linseed Oil | Supreme Linseed Oil | Cargill | P |
| Nuoplaz 6959 | Tri-octyl Trimellitate | Nuodex, Inc. | P |
| 1,6-Hexanediamine | — | Aldrich Chem. Co. | CA |
| 1,6-Hexanedithiol | — | Aldrich Chem. Co. | CA |
| Jeffamine T-403 | Polyether triamine with amine equivalent weight of about 150 | Texaco Chem. Inc. | CA |
| 1,9-Nonanedithiol | — | Aldrich Chem. Co. | CA |
| Irganox 1076 | Octadecyl[8-(3,5-t-butyl-4-hydroxylphenyl)]proprionate | Ciba-Geigy | |
| CasChem 126 | Polyurethane Encapsulant | CasChem Inc. | |
| D-1000 | Polyurethane Encapsulant | AT&T | |

EXAMPLE 1

An encapsulant of the present invention was prepared by mixing 27 parts of Plasthall 100, 22.19 parts of Ricon 131/MA, and 0.81 parts of Sunthene 480 in a beaker, using an air-driven stirrer until the mixture appeared homogeneous. To another beaker, 15.81 parts of Poly BD 45 HT, 33.86 parts of Sunthene 480, and 0.33 parts of Polycat DBU were added and likewise mixed. Equal weight amounts of the mixtures were added to a third beaker and were mixed by hand for 1 minute. Once mixed, the gel time was measured by determining the amount of time required from a 200g sample to reach a viscosity of 1,000 poise using a Sunshine Gel Time Meter, available from Sunshine Scientific Instrument. Clarity was measured visually. Clarity is either transparent (T) or opaque (O).

Tear strength was tested by the procedure of ASTM D-624, tensile strength and elongation were measured by the procedure of ASTM D412; adhesion of the encapsulant to a grease coated wire was measured as described above (C-H adhesion value); and the encapsulants compatibility with polycarbonate (Polycarbonate Compatibility Value, PCV), was also measured as described above. The approximate Total Solubility Parameter for some of the encapsulants was also calculated as described above.

EXAMPLES 2-86, and Comparative Examples

Encapsulants of the invention were prepared and tested as described in Example 1. The formulations and test results are set forth in Tables 1 through 15 below.

TABLE 1

| Components | 1 | 2 | 3 | 4 | 5 |
|---|---|---|---|---|---|
| Ricon 131/MA | 22.19 | 22.19 | 23.36 | 20.44 | 20.44 |
| Poly bd R45 HT | 15.81 | 15.81 | 16.64 | 14.56 | 14.56 |
| DBU | 0.33 | 0.33 | 0.34 | 0.3 | 0.3 |
| Sunthene 480 | 34.67 | 34.67 | | 64.7 | 36.7 |
| Plasthall 100 | 27.0 | | | | 28.0 |
| Witconol APS | | 27.0 | | | |
| Kessco Isocetyl Stearate | | | 59.66 | | |
| Gel - Clarity | T | | | T | T |
| C—H Adhesion Value | | | | | |
| PEPJ | 16.0 | — | — | — | — |
| FLEXGEL | 18.7 | — | — | — | — |
| Tear Strength Kg/cm | 0.5 | — | — | — | — |
| Tensile Strength Kg/cm² | 0.9 | — | — | — | — |
| Elongation % | 103 | — | — | — | — |
| Polycarbonate Compatibility at 50° C. (Breaking Force, Newtons) | | | | | |
| 1 week | 582 | 542 | 551 | 640 | 538 |
| 3 weeks | 524 | 520 | — | 569 | 524 |
| 9 weeks | 502 | 560 | 587 | 489 | 538 |
| PCV* | 93 | 104 | 109 | 91 | 100 |
| Total Solubility Parameter (TSP) | 8.0 | 8.0 | 8.1 | 7.9 | 8.0 |

*Original flexure test value was 538.4 and is given in Table 15

TABLE 2

| Components | 6 | 7 | 8 | 9 | 10 | 11 | 12 |
|---|---|---|---|---|---|---|---|
| Ricon 131/MA | 20.44 | 20.44 | 20.44 | 23.36 | 24.36 | 24.36 | 24.36 |
| Poly bd R45 HT | 14.56 | 14.56 | 14.56 | 16.64 | 15.64 | 15.64 | 15.64 |
| DBU | 0.3 | 0.3 | 0.3 | 0.34 | 0.34 | 0.34 | 0.34 |
| Sunthene 480 | | | | 31.66 | | | |
| Plasthall DTDA | | | | | 24.0 | | 59.66 |
| Plasthall 100 | | | | 28.0 | | | |
| Tufflo 300 | 48.5 | | | | | | |
| Yarmor 302 | 16.2 | | | | | | |
| Flexon 650 | | 41.7 | 39.7 | | 35.66 | | |
| Flexricin P-8 | | 23.0 | | | | | |
| Nuoplaz 6959 | | | 25.0 | | | 59.66 | |
| Gel - Clarity | T | T | T | T | T | T | T |
| C—H Adhesion Value | | | | | | | |
| PEPJ | — | 5.3 | 8.9 | — | 16.4 | 26.7 | 20 |
| FLEXGEL | — | 26.2 | 20 | — | 26.2 | 40.9 | 25.8 |
| Polycarbonate Compatibility at 50° C. (Breaking Force, Newtons) | | | | | | | |
| 1 week | 578 | 587 | 524 | 507 | 560 | 507 | 551 |
| 3 weeks | 533 | 511 | 551 | 520 | 529 | 502 | 489 |
| 9 weeks | 520 | 511 | 542 | 551 | 564 | — | — |
| PCV | 97 | 95 | 101 | 102 | 105 | — | — |
| TSP | 8.1 | 8.1 | 8.2 | 8.1 | 8.1 | 8.6 | 8.4 |

TABLE 3

| Components | 13 | 14 | 15 | 16 | 17 | 18 | 19 |
|---|---|---|---|---|---|---|---|
| Ricon 131/MA | 24.36 | 24.36 | 22.19 | 24.36 | 22.19 | 24.36 | 42.63 |
| Poly bd R45 HT | 15.64 | 15.64 | 15.81 | 15.64 | 15.81 | 15.64 | 27.37 |
| DBU | 0.34 | 0.34 | 0.33 | 0.34 | 0.33 | 0.3 | 0.3 |
| Flexon 650 | 39.66 | 39.66 | | 27.66 | | | 13.3 |
| Falkowood 51 | 20.0 | | | | | | |
| Linseed Oil | | 20.0 | | | | | |
| Plasthall 100 | | | 27.0 | | 34.0 | | |
| Paol 40 | | | 34.67 | | 27.67 | | |
| Soybean Oil | | | | 32.0 | | 59.7 | 16.4 |
| Gel - Clarity | T | T | T | T | T | T | T |
| C—H Adhesion Value | | | | | | | |
| PEPJ | 12.9 | 12.9 | — | 20 | 6.2 | 19.6 | — |
| FLEXGEL | 31.6 | 23.1 | — | 30.2 | 16.9 | 24.4 | — |
| Polycarbonate Compatibility at 50° C. (Breaking Force, Newtons) | | | | | | | |
| 1 week | 520 | 524 | 524 | 569 | — | 534 | 556 |

TABLE 3-continued

| Components | 13 | 14 | 15 | 16 | 17 | 18 | 19 |
|---|---|---|---|---|---|---|---|
| 3 weeks | 520 | 547 | 542 | 551 | — | 565 | 592 |
| 9 weeks | 573 | 568 | 573 | — | — | — | — |
| PCV | 107 | 106 | 107 | — | — | — | — |
| TSP | — | 8.1 | 8.2 | 8.1 | | 8.3 | 8.2 |

TABLE 4

| Components | 20* | 21* | 22* | 23 | 24 | 25 |
|---|---|---|---|---|---|---|
| Ricon 131/MA | 33.97 | 33.97 | 59.45 | 19.15 | 17.69 | 32.1 |
| Castor Oil | 6.03 | 6.03 | 10.55 | | | |
| DBU | 0.34 | 0.34 | 0.4 | 0.34 | 0.34 | |
| Flexon 650 | 59.66 | 37.66 | 29.6 | 59.66 | 59.66 | 40.0 |
| Soybean Oil | | 22.0 | | | | 25.0 |
| Pluronic L101 | | | | 20.85 | | |
| Pluronic L121 | | | | | 22.31 | |
| Ethoduomeen T-13 | | | | | | 2.9 |
| Gel - Clarity | T | T | O | O | O | O |
| C—H Adhesion Value | | | | | | |
| PEPJ | 1.3 | 21.8 | — | — | — | — |
| FLEXGEL | 1.8 | 22.7 | — | — | — | — |
| Tear Strength Kg/cm | — | 0.2 | 0.6 | — | 0.5 | — |
| Tensile Strength Kg/cm$^2$ | — | 0.4 | 2.1 | — | 0.7 | — |
| Elongation % | | 110 | 79 | — | 295 | — |
| Polycarbonate Compatibility at 50° C. (Breaking Force, Newtons) | | | | | | |
| 1 week | 502 | — | — | 520 | — | — |
| 3 weeks | 533 | — | — | 547 | — | — |
| TSP | 7.9 | 8.0 | 8.1 | — | — | — |

*Heated at 50° C.

TABLE 5

| Components | 26 | 27 | 28 | 29 | 30 |
|---|---|---|---|---|---|
| Ricon 131/MA | 36.43 | 34.83 | 33.88 | 38.35 | 37.91 |
| Amine Compound A* | 3.57 | | | | |
| Amine Compound B** | | 5.17 | | | |
| Amine Compound C*** | | | 6.12 | | |
| 1,6-Hexanedithiol | | | | 1.65 | |
| 1,9-Nonanedithiol | | | | | 2.09 |
| DBU | | | | 0.34 | 0.34 |
| Flexon 650 | 27.0 | 27.0 | 27.0 | 26.66 | 26.66 |
| Soybean Oil | 33.0 | 33.0 | 33.0 | 33.0 | 33.0 |
| Gel Time (min.) | 7.9 | 128.7 | 147 | 2.1 | 78.6 |
| Gel - Clarity | T | T | T | T | T |
| C—H Adhesion Value | | | | | |
| PEPJ | — | 6.7 | 9.3 | — | — |
| FLEXGEL | — | 17.8 | 24.4 | — | — |
| Tear Strength Kg/cm | — | 0.6 | 0.6 | — | — |
| Tensile Strength Kg/cm$^2$ | — | 0.3 | 0.3 | — | — |
| Elongation % | — | 236 | 260 | — | — |

*See Preparation C
**See Preparation D
***See Preparation E

TABLE 6

| Components | 31 | 32 | 33 | 34 | 35 |
|---|---|---|---|---|---|
| Ricon 131/MA | | 19.28 | 23.3 | 26.96 | 18.32 |
| Nisso G-3000 | | 20.72 | | | 19.68 |
| Nisso G-2000 | | | 16.7 | | |
| Nisso G-1000 | | | | 13.04 | |
| Nisso BN1015 | 16.44 | | | | |
| Poly bd R45 HT | 24.56 | | | | |
| DBU | 0.34 | 0.3 | 0.3 | 0.3 | 0.33 |
| Soybean Oil | | 37.0 | | | |
| Flexon 650 | 19.66 | 22.7 | 21.7 | 28.7 | |
| Plasthall DTDA | 39.0 | | 38.0 | 31.0 | |
| Sunthene 480 | | | | | 26.67 |
| Plasthall 100 | | | | | 35.0 |

TABLE 6-continued

| Components | 31 | 32 | 33 | 34 | 35 |
|---|---|---|---|---|---|
| Gel - Clarity | T | T | T | T | T |
| C—H Adhesion Value | | | | | |
| PEPJ | 15.1 | 19.1 | 17.8 | 19.6 | 21.3 |
| FLEXGEL | 18.2 | 32.9 | 25.8 | 28.9 | 24.4 |
| Tear Strength Kg/cm | — | 0.3 | — | — | — |
| Tensile Strength Kg/cm$^2$ | — | 1.0 | — | — | — |
| Elongation % | — | 104 | — | — | — |
| Polycarbonate Compatibility at 50° C. (Breaking Force, Newtons) | | | | | |
| 1 week | — | 561 | — | — | — |
| 3 weeks | — | 556 | — | — | — |
| TSP | — | 8.0 | 8.1 | 8.0 | 8.0 |

TABLE 7

| Components | 36 | 37 | 38 | 39 | 40 | 41 | 42 |
|---|---|---|---|---|---|---|---|
| Ricon 131/MA | 20.44 | 20.44 | 20.44 | 20.44 | 22.19 | 24.36 | 20.44 |
| Poly bd R45 HT | 14.56 | 14.56 | 14.56 | 14.56 | 15.81 | 15.64 | 14.56 |
| DBU | 0.2 | 0.3 | 0.3 | 0.2 | 0.3 | 0.34 | 0.2 |
| Emory 2900 | | | | | 43.0 | 44.66 | |
| Flexon 766 | 64.8 | | | | | | |
| Indopol H-100 | | | | | | | 16.2 |
| Plasthall 100 | | | | | 18.7 | | |
| Soybean Oil | | | | | | 15.0 | |
| Calumet 450 | | | | | | | 48.6 |
| Flexon 391 | | 64.7 | | | | | |
| Sundex 750T | | | 64.7 | | | | |
| Telura 171 | | | | 64.8 | | | |
| Gel - Clarity | T | T | T | T | T | T | T |
| C—H Adhesion Value | | | | | | | |
| PEPJ | 0.9 | 10.2 | 20.4 | 18.7 | — | 14.2 | 1.3 |
| FLEXGEL | 1.8 | 29.8 | 25.3 | 27.6 | — | 28.4 | 3.6 |
| Polycarbonate Compatability at 50° C. (Breaking Force, Newtons) | | | | | | | |
| 1 weeks | — | — | — | — | 564 | — | — |
| 3 weeks | — | — | — | — | — | — | — |
| 9 weeks | — | — | — | — | 533 | — | — |
| PCV | — | — | — | — | 99 | — | — |
| TSP | 7.8 | 7.9 | 8.0 | 8.0 | 8.0 | 8.0 | 7.8 |

TABLE 8

| Components | 43 | 44 | 45 | 46 | 47 | 48 | 49 | 50 |
|---|---|---|---|---|---|---|---|---|
| Ricon 131/MA | 20.44 | 20.44 | 20.44 | 20.44 | 20.44 | 20.44 | 20.44 | 20.44 |
| Poly bd R45 HT | 14.56 | 14.56 | 14.56 | 14.56 | 14.56 | 14.56 | 14.56 | 14.56 |
| DBU | 0.2 | 0.2 | 0.2 | 0.2 | 0.2 | 0.2 | 0.2 | 0.2 |
| Tufflo 300 | 48.6 | 48.6 | 48.6 | 48.6 | 48.6 | 48.6 | 48.6 | 48.6 |
| Witconol APS | 16.2 | | | | | | | 8.1 |
| Yarmor 302 | | 16.2 | | | | | | |
| Dipentene | | | 16.2 | | | | | |
| Wickenol 171 | | | | 16.2 | | | | |
| Schercemol PGDP | | | | | 16.2 | | | |
| Finsolv TN | | | | | | 16.2 | | |
| Cykelin | | | | | | | 16.2 | |
| Escopol R-020 | | | | | | | | 8.1 |
| Gel - Clarity | T | T | T | T | T | T | T | T |

TABLE 8-continued

| Components | 43 | 44 | 45 | 46 | 47 | 48 | 49 | 50 |
|---|---|---|---|---|---|---|---|---|
| C—H Adhesion Value | | | | | | | | |
| PEPJ | 18.2 | 20.4 | 12.4 | 16.4 | 23.6 | 19.6 | 6.7 | 18.7 |
| FLEXGEL | 27.1 | 28 | 14.7 | 33.3 | 24.4 | 26.7 | 18.2 | 25.3 |
| TSP | 8.0 | 8.2 | 8.0 | — | — | — | — | — |

TABLE 9

| Components | 51 | 52 | 53 | 54 | 55 | 56 |
|---|---|---|---|---|---|---|
| Ricon 131/MA | 20.44 | 20.44 | 20.44 | 20.44 | 20.44 | 20.44 |
| Poly bd R45 HT | 14.56 | 14.56 | 14.56 | 14.56 | 14.56 | 14.56 |
| DBU | 0.2 | 0.2 | 0.2 | 0.2 | 0.2 | 0.2 |
| Tufflo 300 | 48.6 | 48.6 | 48.6 | | 48.6 | 48.6 |
| Diundecyl Phthallate | 16.2 | | | | | |
| Nuoplaz 6959 | | 16.2 | | | | |
| Alpha-Terpineol | | | 16.2 | | | |
| Calumet 450 | | | | 48.6 | | |
| Tarpine 66 | | | | 16.2 | | |
| Flexricin P-8 | | | | | 16.2 | |
| Tricrecyl Phosphate | | | | | | 16.2 |
| Gel - Clarity | T | T | T | O | T | T |
| C—H Adhesion Value | | | | | | |
| PEPJ | 12.4 | 11.6 | 18.7 | 5.3 | 11.6 | 9.3 |
| FLEXGEL | 29.3 | 27.6 | 26.2 | 18.7 | 26.7 | 23.6 |
| TSP | 8.1 | 8.1 | 8.2 | — | 8.1 | 8.0 |

TABLE 10

| Components | 57 | 58 | 59 | 60 |
|---|---|---|---|---|
| Lithene PM 12MA | 17.04 | | | |
| Poly bd R45 HT | 20.96 | 15.50 | 16.01 | 24.7 |
| DBU | 0.33 | 0.3 | 0.4 | 1.32 |
| Sunthene 480 | 41.67 | | | |
| Plasthall 100 | 20.0 | 32.0 | 22.0 | |
| Lithene PM 25MA | | 0.92 | | |
| Ricon 131 MA | | 18.52 | 18.04 | |
| Flexon 650 | | 32.76 | 42.6 | |
| PA-18 | | | 0.95 | 7.49 |
| Tufflo 500 | | | | 66.49 |
| Gel - Clarity | T | O | T | T |
| C—H Adhesion Value | | | | |
| PEPJ | 4.4 | 17.3 | 8 | |
| FLEXGEL | 7.1 | 18.7 | 16.4 | |
| Tear Strength Kg/cm | 0.1 | 0.3 | — | 0.03 |
| Tensile Strength $Kg/cm^2$ | 0.2 | 0.7 | — | 0.1 |
| Elongation % | 218 | 160 | — | 94 |

TABLE 11

| Components | 61 | 62 | 63 | 64*** | 65 |
|---|---|---|---|---|---|
| Ricon 184/MA | 24.28 | 42.49 | | | |
| Lithene LX 16-10MA | | | 19.82 | | |
| Maleinized Linseed Oil* | | | | 21.13 | |
| Maleinized Polyisoprene** | | | | | 23.47 |
| Poly bd R45 HT | 15.72 | 27.51 | 20.18 | 38.87 | 16.53 |
| DBU | 0.3 | 0.3 | 0.3 | 0.3 | 0.2 |
| Flexon 650 | 19.7 | 9.8 | 24.7 | 36.4 | 34.8 |
| Soybean Oil | 40.0 | 19.9 | 35.0 | 3.3 | 25.0 |
| Gel - Clarity | T | T | T | T | T |
| C—H Adhesion Value | | | | | |
| PEPJ | 13.3 | — | 12.4 | 25.8 | — |
| FLEXGEL | 19.1 | — | 20 | 33.3 | — |
| Tear Strength Kg/cm | 0.5 | 1.3 | 0.4 | 0.6 | — |
| Tensile Strength $Kg/cm^2$ | 0.8 | 2.3 | 1.3 | 1.5 | — |
| Elongation % | 200 | 158 | 69 | 249 | |

*See Preparation A
**See Preparation B
***Heated at 60° C. for 42 hours

TABLE 12

| Components | 66 | 67 | 68 | 69 | 70 | 71 |
|---|---|---|---|---|---|---|
| Ricon 131/MA | 20.45 | 36.21 | 26.64 | 18.95 | 22.07 | 22.2 |
| Pluracol TPE 4542 | 19.55 | | | | | |
| Poly bd R45 HT | | | | | 12.56 | 12.65 |
| Flexricin 17 | | 3.79 | | | | |
| Nisso GI-1000 | | | 13.36 | | | |
| Nisso GI-3000 | | | | 21.05 | | |
| DBU | 0.34 | 0.34 | 0.3 | 0.3 | 0.24 | 0.24 |
| Flexon 650 | | 29.66 | 29.7 | 24.7 | | |
| Tufflo 300 | | | | | 64.7 | 64.7 |
| Soybean Oil | 59.66 | 30.0 | 30.0 | 35.0 | | |
| Sovermol VP95 | | | | | 0.43 | |
| Quadrol | | | | | | 0.21 |
| Gel - Clarity | T | T | T | T | T | T |
| C—H Adhesion Value | | | | | | |
| PEPJ | — | 6.2 | 22.2 | 28 | — | — |
| FLEXGEL | — | 13.8 | 23.6 | 36.9 | — | — |
| Tear Strength Kg/cm | 0.3 | 0.1 | 0.4 | 0.5 | — | — |
| Tensile Strength $Kg/cm^2$ | 0.7 | 0.3 | 1.0 | 1.0 | — | — |
| Elongation % | 162 | 65 | 95 | 116 | — | — |

TABLE 13

| Components | 72 | 73 | 74 | 75 | 76 | 77 | 78 | 79 |
|---|---|---|---|---|---|---|---|---|
| Ricon 131/MA | 30.45 | 42.63 | 24.36 | 22.19 | | | | |
| PA-18 | | | | | | 6.96 | 6.96 | |
| Poly bd R45 HT | 19.55 | 27.37 | 15.64 | 15.81 | 10.05 | 22.96 | 22.96 | 8.04 |
| DBU | 0.3 | 0.3 | | | 0.2 | | | |
| Sunthene 480 | 27.7 | 16.7 | 31.1 | 34.1 | | | | |
| Plasthall 100 | 22.0 | 13.0 | 28.0 | 27.0 | | | | |
| T-8 | | | | | | | 1.85 | 2.0 |
| SA-1 | | | 0.9 | | | | | |
| DABCO 33-LV | | | | | | 7.41 | 5.56 | 1.0 |
| SA-102 | | | | 0.9 | | | | |
| Ricon 184/MA | | | | | 14.95 | | | 11.96 |
| Tufflo 500 | | | | | 74.8 | 62.67 | 62.67 | 77.00 |
| Gel Time (min) | | | | | | 136 | 43 | 14.1 |
| Gel - Clarity | T | T | T | T | T | T | T | T |
| Tear Strength Kg/cm | 0.6 | 1.3 | 0.8 | 0.4 | 0.2 | — | — | — |
| Tensile Strength $Kg/cm^2$ | 1.6 | 2.9 | 1.4 | 1.1 | 0.4 | — | — | — |
| Elongation % | 109 | 94 | 94 | 92 | 505 | | | |

TABLE 14

| Components | 80* | 81* | 82* | 83 | 84 | 85 | 86 |
|---|---|---|---|---|---|---|---|
| DBU | | | 0.15 | | | | |
| Ricon 131/MA | | | | | | 23.9 | 24.36 |
| Ricon 184/MA | 8.97 | 11.96 | 11.96 | 24.0 | 13.99 | | |
| Poly bd R45 HT | 6.03 | 8.04 | 8.04 | | | 16.1 | 15.64 |
| Tufflo 500 Oil | 82.00 | 77.00 | 79.85 | 75.0 | 85.0 | | |
| Quadrol | | | | 1.0 | | | |
| T-8 | 2.00 | 2.00 | | | | | |
| Dabco 33-LV | 1.00 | | | | | | |
| Irganox 1076 | | | | | | | 3.6 |

TABLE 14-continued

| Components | 80* | 81* | 82* | 83 | 84 | 85 | 86 |
|---|---|---|---|---|---|---|---|
| Pluracol 355 | | | | | 1.01 | | |
| ADMA 4 | | | | | | 1.0 | 1.0 |
| N,N,N',N'-tetramethyl-1,4-butane-diamine | | 1.0 | | | | | |
| Flexon 650 | | | | | | 26.0 | 22.4 |
| Soybean Oil | | | | | | 33.0 | 33.0 |
| Gel Time (min) | 19.9 | 49.5 | 51.1 | 4.9 | 24.5 | — | 60 |
| Gel - Clarity | T | T | T | T | T | T | T |
| C—H Adhesion Value (N/conductor) | | | | | | | |
| PEPJ | — | — | — | — | — | — | 18.2 |
| FLEXGEL | — | — | — | — | — | — | 31.6 |
| Tear Strength Kg/cm | — | — | — | — | — | 0.6 | 0.6 |
| Tensile Strength Kg/cm$^2$ | — | — | — | — | — | 1.4 | 1.3 |
| Elongation % | — | — | — | — | — | 107 | 136 |

TABLE 15

| | COMPARATIVE EXAMPLES | | | |
|---|---|---|---|---|
| Components | A | B | C | D |
| | Control | Heated Control | D1000 | 126 |
| Polycarbonate Compatibility at 50° C. (Breaking Force, grams) | 538.4 | | | |
| 1 week | | 570 | 507 | 498 |
| 3 weeks | | 574 | 476 | 449 |
| 9 weeks | | 552 | 405 | 369 |
| PCV | | | 75 | 69 |

What is claimed is:

1. A signal transmission component comprising:

a) a signal transmission device; and b) a dielectric encapsulant which encapsulates said device, said encapsulant having a C-H adhesion value of at least 4.0 comprising:

the extended reaction product of an admixture of:

a) an effective amount of an anhydride functionalized compound having reactive anhydride sites; and b) an effective amount of a crosslinking agent which reacts with the anhydride sites of said compound to form a cured crosslinked material;

said reaction product extended with at least one organic plasticizer present in the range of between 5 and 95 percent by weight of said encapsulant to form a plasticized system which is essentially inert to the reaction product and substantially non-exuding therefrom.

2. The component of claim 1 wherein said anhydride functionalized compound is a maleic anhydride functionalized vegetable oil.

3. The component of claim 1 wherein said anhydride functionalized compound comprises an anhydride functionalized polyolefin.

4. The component of claim 3 wherein said anhydride functionalized compound is a maleic anhydride functionalized polybutadiene.

5. The component of claim 1 wherein said at least one organic plasticizer is present in the range of between about 35 and 85 percent by weight of the encapsulant.

6. The component of claim 1 wherein said at least one organic plasticizer is selected from the group consisting of petroleum based hydrocarbon oils, vegetable oils, polyalphaolefins, cyclic polyolefins, pine oil derivatives, phosphate esters and mixtures thereof.

7. The component of claim 1 wherein said at least one organic plasticizer comprises a mixture of hydrocarbon oil and an ester.

8. The component of claim 7 wherein said at least one organic plasticizer comprises a vegetable oil.

9. The component of claim 1 wherein said encapsulant has a Polycarbonate Compatability Value of at least 80.

10. The component of claim 9 wherein said encapsulant has a Polycarbonate Compatability Value of at least 90.

11. The component of claim 1 further including an effective amount of a catalyst for the reaction between said anhydride functionalized compound and said crosslinking agent.

12. The component of claim 11 wherein said catalyst is a tertiary amine.

13. The component of claim 12 wherein said catalyst is selected from the group consisting of 1,8-diazabicyclo (5.4.0)-undec-7-ene and 1,5-diazabicyclo-(4.3.0)non-5-ene, tetradecyldimethylamine, and salts thereof.

14. The component of claim 1 wherein said crosslinking agent is selected from the group consisting of polyols, polyamines, and polythiols.

15. The component of claim 14 wherein said crosslinking agent is a polyol.

16. The component of claim 15 wherein said polyol is a ricinoleic acid derivative.

17. The component of claim 15 wherein said crosslinking agent is a polyalkadiene polyol.

18. The component of claim 17 wherein said crosslinking agent is a polybutadiene polyol.

19. The component of claim 1 wherein the solubility parameter of said encapsulant is between about 7.0 and 9.5.

20. The component of claim 19 wherein the total solubility parameter of said encapsulant is between about 7.9 and 9.5.

21. The component of claim 20 wherein the total solubility parameter of said encapsulant is between about 7.9 and 8.6.

22. The component of claim 21 wherein the total solubility parameter of said encapsulant is between about 8.0 and 9.3.

23. The component of claim 22 wherein said at least one organic plasticizer is present in the range of between about 50 and 70 percent by weight of the encapsulant.

24. The component of claim 1 wherein said device comprises an electrical or optical cable.

25. The component of claim 24 wherein said encapsulant is a pressure plug for said electrical or optical cable.

26. The component of claim 24 wherein said electrical or optical cable comprises a plurality of electrical or optical conductors.

27. The component of claim 26 wherein said plurality of electrical or optical conductors are surrounded by a grease.

28. The component of claim 27 wherein said encapsulant has a C-H adhesion value of at least 13.0.

29. The component of claim 28 wherein said encapsulant has a Polycarbonate Compatability Value of at least 90.

30. The component of claim 24 further including at least one connecting device.

31. The component of claim 30 wherein said connecting device comprises polycarbonate.

32. The component of claim 31 wherein said encapsulant has a Polycarbonate Compatibility Value of at least 80.

33. The component of claim 32 wherein said encapsulant has a Polycarbonate Compatibility Value of at least 90.

34. The component of claim 1 wherein said device comprises a) an outer enclosure member;

b) at least one electrical or optical cable, including at least one conductor; and c) at least one connecting device located inside said outer enclosure member and joining said at least one conductor; wherein said encapsulant substantially fills said enclosure member, encapsulating said at least one connecting device.

* * * * *

UNITED STATES PATENT AND TRADEMARK OFFICE

CERTIFICATE OF CORRECTION

PATENT NO. : 5,169,716

DATED : December 8, 1992

INVENTOR(S) : Thomas S. Croft and Hartwick A. Haugen

It is certified that error appears in the above-identified patent and that said Letters Patent is hereby corrected as shown below:

Col. 7, line 15, "dimetyhlamino" should read --dimethylamino--.

Signed and Sealed this

Twelfth Day of April, 1994

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO.: 5,169,716

DATED: December 8, 1992

INVENTOR(S): Thomas S. Croft and Hartwick A. Haugen

It is certified that error appears in the above-identified patent and that said Letters Patent is hereby corrected as shown below:

Col. 20, line 47, "9.3" should read --8.3--.

Signed and Sealed this

Thirteenth Day of October 1998

*Attest:*

BRUCE LEHMAN

*Attesting Officer*

*Commissioner of Patents and Trademarks*